US012290946B2

(12) United States Patent
Zhang et al.

(10) Patent No.: US 12,290,946 B2
(45) Date of Patent: May 6, 2025

(54) TOOL STRUCTURE FACILITATING THE ADJUSTMENT OF BLADE TENSION

(71) Applicant: HUOXIONG GUANGZHOU TECHNOLOGY COMPANY LIMITED, Guangzhou (CN)

(72) Inventors: Liang Zhang, Foshan (CN); Yue Dong, Shanghai (CN)

(73) Assignee: HUOXIONG GUANGZHOU TECHNOLOGY COMPANY LIMITED, Guangzhou (CN)

(*) Notice: Subject to any disclaimer, the term of this patent is extended or adjusted under 35 U.S.C. 154(b) by 138 days.

(21) Appl. No.: 18/340,812

(22) Filed: Jun. 23, 2023

(65) Prior Publication Data

US 2024/0408776 A1 Dec. 12, 2024

(30) Foreign Application Priority Data

Jun. 7, 2023 (CN) ........................ 202321434306.9

(51) Int. Cl.
*B26B 1/04* (2006.01)

(52) U.S. Cl.
CPC .................................. *B26B 1/042* (2013.01)

(58) Field of Classification Search
CPC ........... B26B 1/042; B26B 1/046; B26B 1/00; B26B 1/02; B26B 1/04
USPC ........................................ 30/155, 160, 161
See application file for complete search history.

(56) References Cited

U.S. PATENT DOCUMENTS

| | | | | |
|---|---|---|---|---|
| 5,722,168 A * | 3/1998 | Huang | B23D 51/01 30/160 |
| 6,446,341 B1 * | 9/2002 | Wang | B26B 5/00 30/155 |
| 10,131,059 B2 * | 11/2018 | Ikoma | B26B 1/042 |
| 10,464,221 B2 * | 11/2019 | Ikoma | B26B 1/042 |

FOREIGN PATENT DOCUMENTS

| | | |
|---|---|---|
| CN | 204997132 U | 1/2016 |
| CN | 206104992 U | 4/2017 |
| CN | 212443473 U | 2/2021 |

* cited by examiner

*Primary Examiner* — Phong H Nguyen
(74) *Attorney, Agent, or Firm* — Zhigang Ma

(57) ABSTRACT

A folding knife comprises a shank, a blade, a sleeve, a T-shaped lock lever, a cover plate, and an adjusting screw. The shank comprises a left handle and a right handle defining a storage slot. The sleeve has a guide hole and a guide slot. The T-shaped lock lever has a button lever and a guide lever, and the guide lever comprises a first lock catch and a second lock catch. The lock lever is installed in the guide hole. The blade has a lock hole. The cover plate is located on a right side of the right handle and is connected to a right end of the sleeve by adjusting screws.

8 Claims, 11 Drawing Sheets

TOOL STRUCTURE FACILITATING THE ADJUSTMENT OF BLADE TENSION

CROSS-REFERENCE TO RELATED APPLICATIONS

The application claims priority to Chinese patent application No. 2023214343069, filed on Jun. 7, 2023, the entire contents of which are incorporated herein by reference.

TECHNICAL FIELD

The present disclosure relates to a tool structure that facilitates adjusting the tension of the blade.

BACKGROUND

The statement herein only provides background information related to the present invention and does not necessarily constitute prior art.

Folding knife, as a daily tool, is crucial for people to operate conveniently, safely and reliably. However, there are still some shortcomings in the existing folding knives. Specifically, some existing folding knives (for example, Chinese Patent CN105500407B) require the outer shell of the shank to be removed before adjusting the tension of the blade, which is very inconvenient; Furthermore, some existing folding knives have a large number of locking mechanism parts and processing procedures, and due to the large number of parts, it is difficult to ensure the fit tolerance between the parts, as a result, there is a greater risk of jamming and loosening when the folding knives are used; Secondly, the existing locking structure is not good enough, and the working stability (reliability) when unlocking/locking is not high enough.

For this reason, it is necessary to study a new technical solution to solve the above problems.

SUMMARY

In order to solve the above-mentioned defects and deficiencies of the prior art, the present invention provides a tool structure that facilitates adjusting the tension of the blade, wherein, the design of the blade tension adjustment structure ensures that when adjusting the blade tension of the tool of the present application, only the exposed adjusting screw needs to be turned, and there is no need to disassemble components such as the shell, which has the advantage of convenient adjustment; meanwhile, it improves the smoothness and reliability of the blade during storage/deployment.

To achieve the above objectives, the present invention adopts the following technical solution:

A tool structure that facilitates adjusting the tension of the blade, comprising a shank and a blade foldable in the shank; It further comprises a sleeve, a lock lever, a cover plate and an adjusting screw;

The shank comprises a left handle and a right handle, and a storage slot formed between the left handle and the right handle, which is adapted to the shank; The left and right handles are both equipped with transverse mounting holes that are adapted to the sleeve, and the sleeve is installed in the transverse mounting hole;

The sleeve has a guide hole arranged horizontally and a guide slot arranged on the right side of the sleeve; The lock lever is T-shaped, which has a button lever and a guide lever connected to the right side of the button lever. The guide lever is equipped with a first lock catch and a second lock catch; The lock lever is installed on the guide hole of the sleeve, and the guide slot is adapted to the guide lever; moreover, the blade has a lock hole adapted to the first lock catch and second lock catch;

The cover plate is located on the right side of the right handle and is connected to the right end of the sleeve by means of adjusting screws, and the cover plate is also provided with a compression portion for pressing the right handle.

In some embodiments, it further comprises an elastic reset component that drives the lock lever to reset.

In some embodiments, the elastic reset component is a reset spring, the lock lever is provided with a spring hole for mounting the reset spring, and the cover plate is equipped with a guide pillar corresponding to the reset spring.

In some embodiments, the left end of the button lever is an unlocking press portion, and the sleeve is equipped with a sink corresponding to the unlocking press portion, and the left end face of the Button lever is located on the right side of the left end face of the sink.

In some embodiments, the left end of the sleeve is provided with a stop step.

In some embodiments, the left handle has a left side panel and a left lining located on the right side of the left side panel, while the right handle has a right side panel and a right lining located on the left side of the right side panel; The blade is located between the left lining and the right lining.

In some embodiments, the shank is provided with a stroke slot, and the shank is equipped with a limit rod that is adapted to the Stroke slot.

In some embodiments, the shank is provided with a clip.

The present invention has obvious advantages and beneficial effects compared to the prior art, specifically, as can be seen from the above technical solutions, which are mainly:

1. The design of the blade tension adjustment structure ensures that when adjusting the blade tension of the tool of the present application, only the exposed adjusting screw needs to be turned, and there is no need to disassemble components such as the shell, which has the advantage of convenient adjustment;
2. The locking and blade adjustment mechanism of the tool in the present application use fewer components, which simplifies the structure and improves the economy. Meanwhile, it also facilitates the manufacturing, assembly, maintenance, and other work of the tool;
3. The installation of guide slot, guide lever and other structures improves the smoothness and reliability of blade storage/deployment;
4. The tool of the present application will not affect the use of the locking structure when adjusting the tension of the blade, which ensures the stability of the locking structure of the tool.

In order to more clearly illustrate the structural features and functions of the present invention, the following is a detailed description of the present invention in conjunction with the accompanying drawings and specific embodiments.

DESCRIPTION OF THE KEY IN THE DRAWINGS

Figure 1:
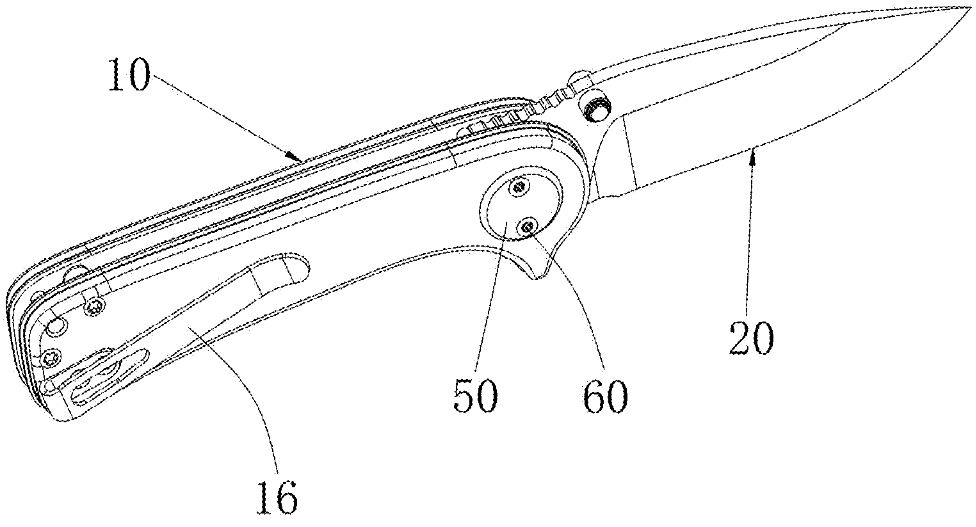
FIG. 1 shows a three-dimensional schematic diagram of an embodiment of the present invention.
Figure 2:
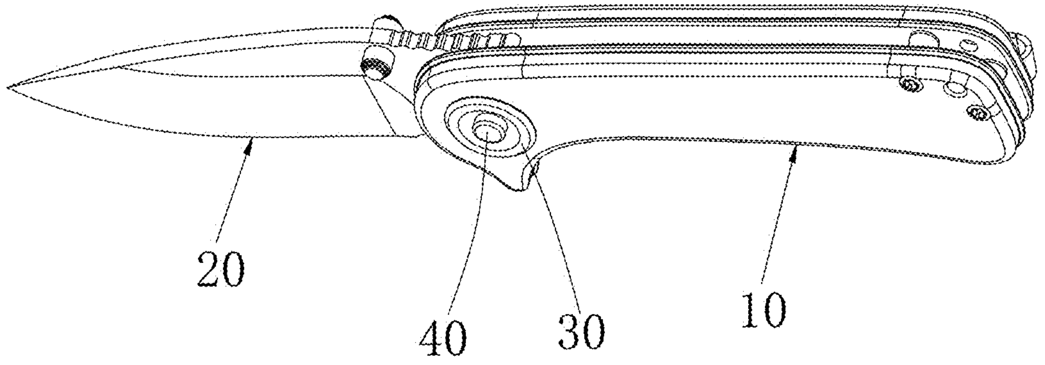
FIG. 2 shows a three-dimensional schematic diagram of an embodiment of the present invention from another perspective.
Figure 3:
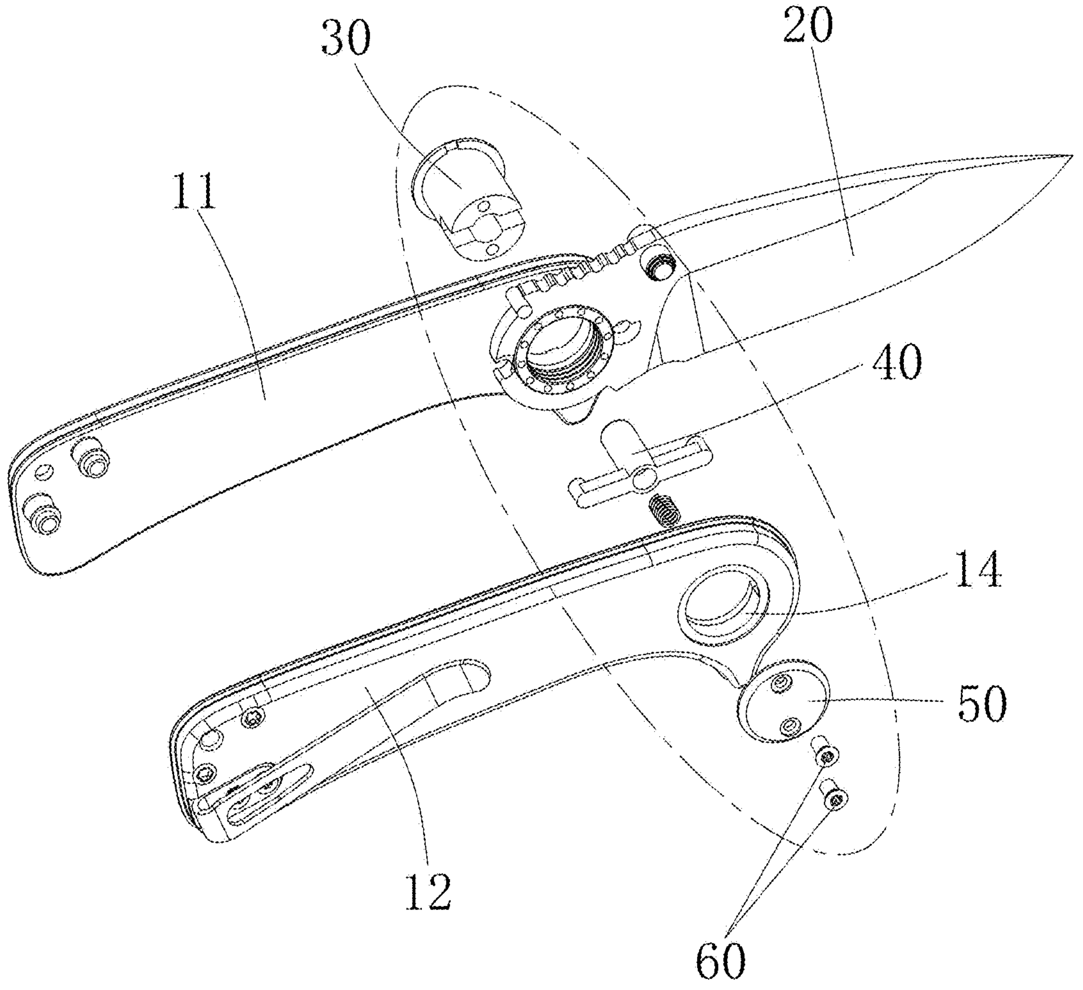
FIG. 3 shows a first exploded schematic diagram of an embodiment of the present invention (blade deployment state)
Figure 4:
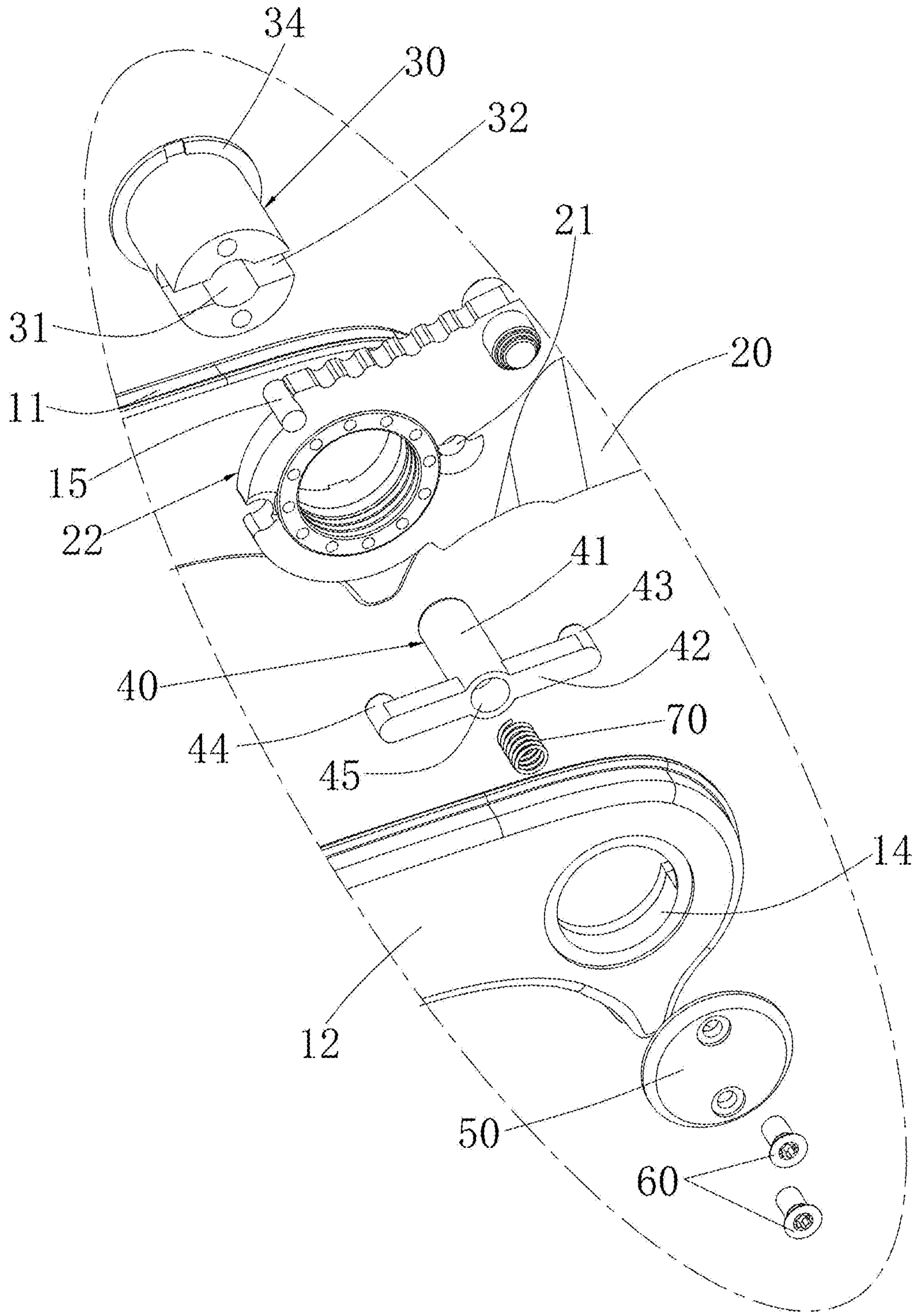
FIG. 4 shows a partially enlarged view of FIG. 3.
Figure 5:
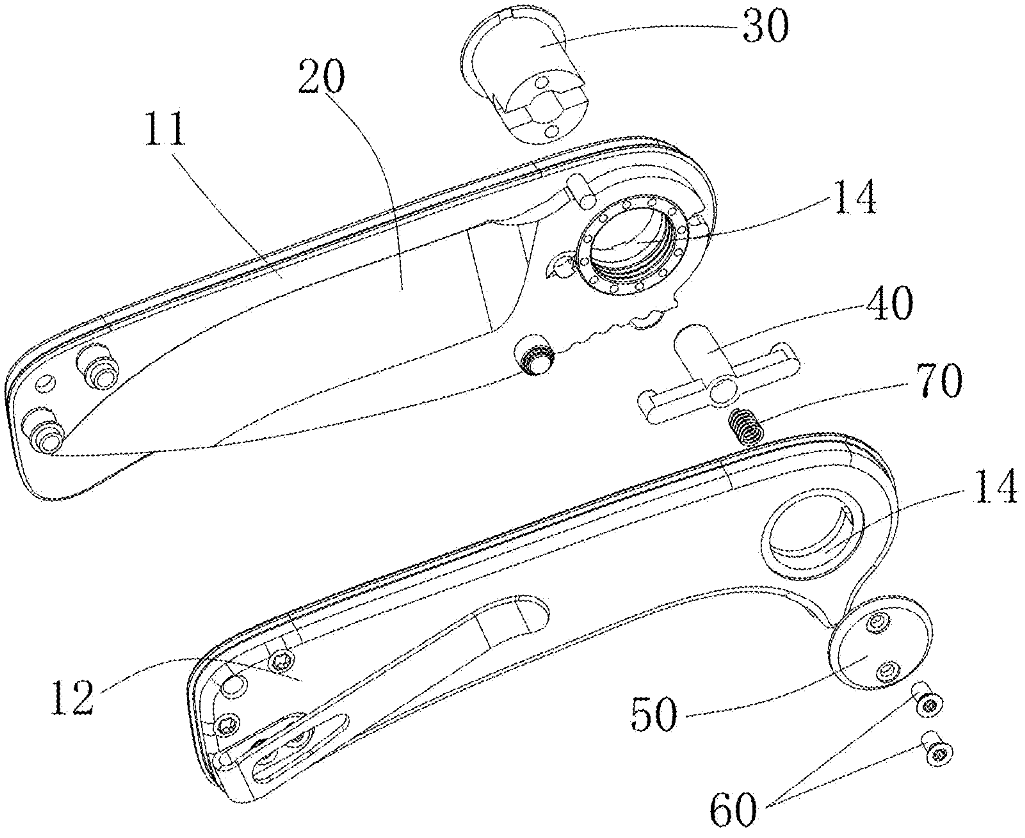
FIG. 5 shows a second exploded schematic diagram of an embodiment of the present invention (blade storage state)
Figure 6:
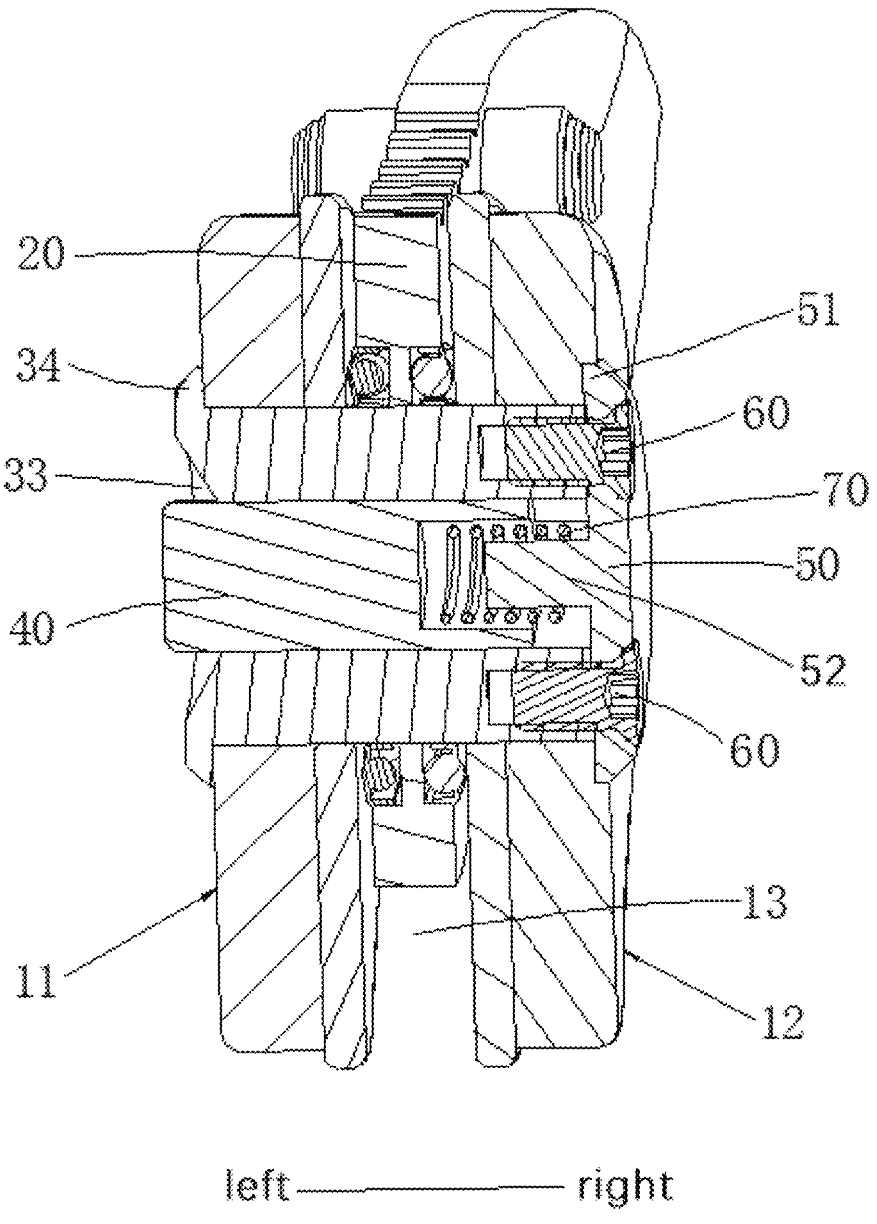
FIG. 6 shows a first cross-sectional schematic diagram of an embodiment of the present invention.
Figure 7:
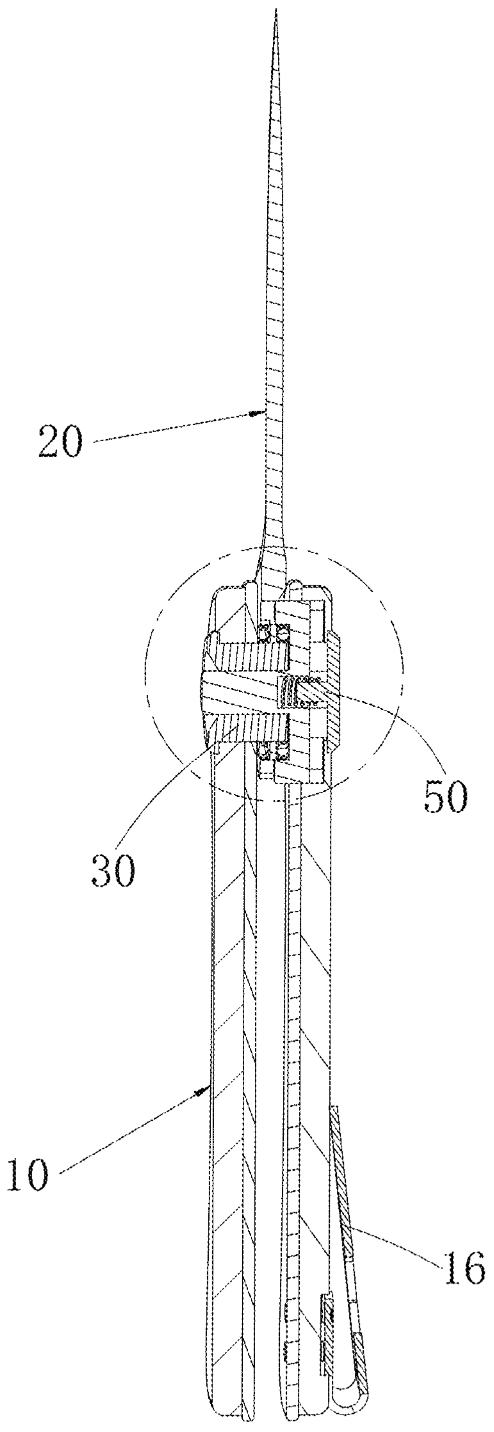
FIG. 7 shows a second cross-sectional schematic diagram of an embodiment of the present invention.

10. Shank; 11. Left handle; 12. Right handle; 121. Right side panel; 122. Right lining; 1221. Strip limit slot; 13. Storage slot; 14. Transverse mounting hole; 15. Limit rod; 16. Clip; 20. Blade; 21. Lock hole; 22. Stroke slot; 30. Sleeve; 31. Guide hole; 32. Guide slot; 33. Sink; 34. Stop step; 40. Lock lever; 41. Button lever; 42. Guide lever; 43. First lock catch; 44. Second lock catch; 45. Spring hole; 50. Cover plate; 51. Compression portion; 52. Guide pillar; 60. Adjusting screw; 70. Reset spring.

DETAILED DESCRIPTION OF THE EMBODIMENTS

The following will provide a clear and complete description of the technical solution in this embodiment of the present invention in conjunction with the accompanying drawings, and it is clear that the described embodiment is only a preferred embodiment of the present invention.

It should be noted that when a component is referred to as "fixed to" another component, it may be directly attached to another component or there may be a centered component. When a component is considered to be "connected to" another component, it may be directly connected to another component or there may also be a centered component. The terms "vertical", "horizontal", "left", "right", and similar expressions used in this article are for illustrative purposes only and do not necessarily represent the exclusive implementation method.

Unless otherwise defined, all technical and scientific terms used in this article have the same meanings as those commonly understood by those skilled in the technical field of the present invention. The terms used in the specification of the present invention in this article are only for the purpose of describing specific embodiments and are not intended to limit the present invention. The term "and/or" used in this article includes any and all combinations of one or more related listed items.

Referring to FIG. 1 to FIG. 11, in the embodiment of the present invention, a tool structure that facilitates adjusting the tension of the blade comprises a shank 10 and a blade 20 foldable in the shank 10; It further comprises a sleeve 30, a lock lever 40, a cover plate 50, and an adjusting screw 60;

The shank 10 comprises a left handle 11 and a right handle 12, and a storage slot 13 formed between the left handle 11 and the right handle 12, which is adapted to the shank 20; The left handle 11 and the right handle 12 are both equipped with a transverse mounting hole 14 that is adapted to the sleeve 30, and the sleeve 30 is installed in the transverse mounting hole 14;

The sleeve 30 has a guide hole 31 arranged horizontally and a guide slot 32 arranged on the right side of the sleeve 30; The lock lever 40 is T-shaped, which has a button lever 41 and a guide lever 42 connected to the right side of the button lever 41. The guide lever 42 is equipped with a first lock catch 43 and a second lock catch 44; The lock lever 40 is installed on the guide hole 31 of the sleeve 30, and the guide slot 32 is adapted to the guide lever 42; moreover, the blade 20 has a lock hole 21 adapted to the first lock catch 43 and second lock catch 44;

The cover plate 50 is located on the right side of the right handle 12 and is connected to the right end of the sleeve 30 by means of the adjusting screw 60, and the cover plate 50 is also provided with a compression portion 51 for pressing the right handle 51.

When adjusting the tension of the blade 20, turn the adjusting screw 60 to change the gap between the left handle 11 and the right handle 12 (i.e., change the clamping force of the two on the blade 20), thereby achieving the tension adjustment of the blade 20. It is not necessary to first disassemble components such as the shell, as in existing technology, which is very convenient; Meanwhile, the tool structure of the present application requires fewer parts to achieve locking/unlocking of the blade. For the complex locking structure in the existing technology, it can better guarantee assembly tolerance between parts, ensure smoothness, avoid problems such as jamming and damage, and also has the advantages of low cost and fewer assembly steps; Furthermore, a guide slot 32 and a guide lever 42 are provided for guiding coordination, thereby further improving the smoothness and reliability of the blade 20 during storage/deployment;

Moreover, the tool structure of the present application will not affect the use of the locking structure when adjusting the tension of the blade 20, which ensures the stability of the locking structure.

Specifically, it further comprises an elastic reset component that drives the lock lever 40 to reset, thereby completing the storage or deployment of the blade 20 and releasing the external force that presses the lock lever 40. The elastic reset component can drive the lock lever 40 to reset, thereby achieving automatic locking, which has the advantages of labor-saving and more convenient. In practical application, the elastic reset component is a reset spring 70, the lock lever 40 is provided with a spring hole 45 for mounting the reset spring 70, and the cover plate 50 is equipped with a guide pillar 52 corresponding to the reset spring 70; In this way, it has the advantages of clever structure and low manufacturing cost.

Preferably, the left end of the button lever 41 is an unlocking press portion, and the sleeve 30 is equipped with a sink 33 corresponding to the unlocking press portion, and the left end face of the button lever 41 is located on the right side of the left end face of the sink 33; Thus, it can prevent users from accidentally touching it, moreover, the design of the sink 33 can also avoid affecting the grip of the shank 10.

Preferably, the left end of the sleeve 30 is provided with a stop step 34, so that the left end of the sleeve 30 is locked onto the shank 10 by means of the stop step 34 and the adjusting screw 60.

Typically, the left handle 11 has a left side panel and a left lining located on the right side of the left side panel, while the right handle 12 has a right side panel 121 and a right lining 122 located on the left side of the right side panel 121; The blade 20 is located between the left lining and the right lining; By turning the adjusting screw 60, the distance between the left lining and the right lining 122 can be changed, and the clamping force on the blade 20 can be changed to achieve the tension adjustment of the blade 20; The left lining and the right lining 122 are preferably made of hardware (such as ferroalloy, aluminum alloy, stainless steel, etc.), so as to ensure the use safety of the tool; Specifically, referring to FIG. 10 and FIG. 11, the right lining 122 has a strip limit slot 1221 adapted to the guide lever 42 of the lock lever 40. After installation, the guide lever 42 is located in the strip limit slot 1221; Thereby, the problem that the blade 20 rotates due to excessive force on the blade 20 when the tool is in use is avoided, which further improves its safety.

Preferably, the shank 10 is equipped with a stroke slot 22, and the shank 10 is equipped with a limit rod 15 that is adapted to the stroke slot 22; Usually, the shank 10 is equipped with a clip 16 for easy carriage.

Figure 8:
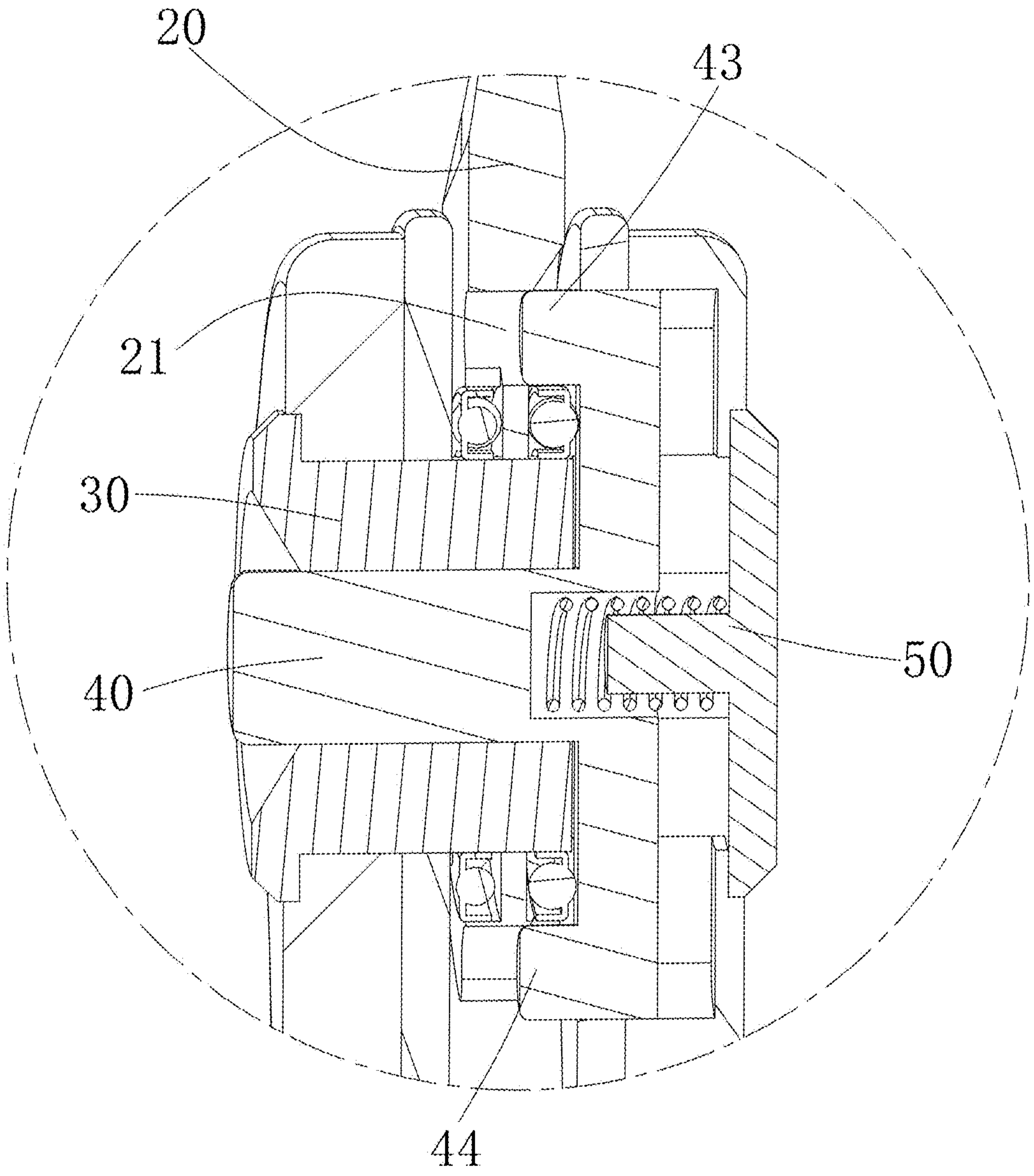
FIG. 8 shows a partially enlarged view of FIG. 7.
Figure 9:
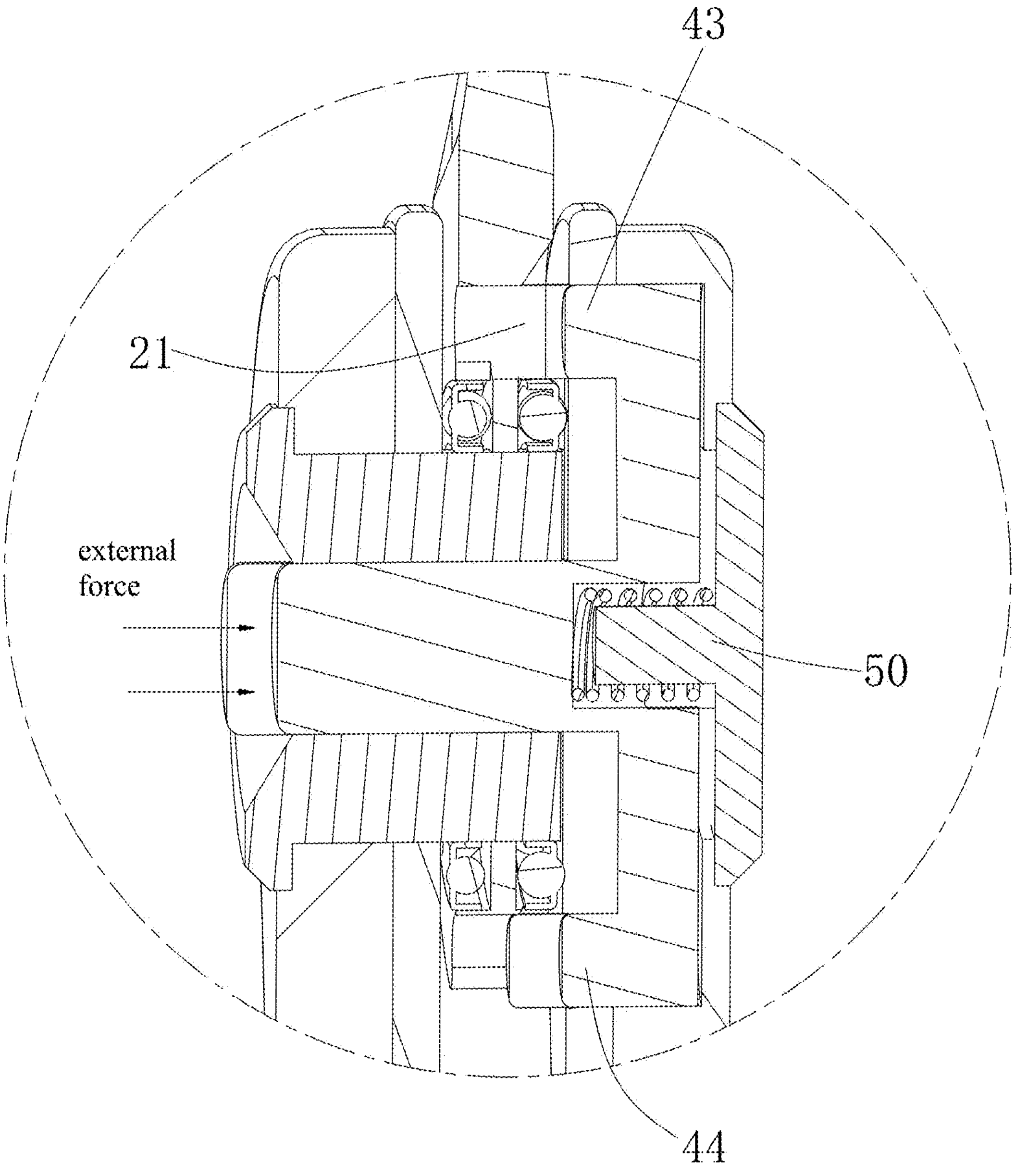
FIG. 9 shows a schematic diagram of the unlocking principle of an embodiment of the present invention.
Figure 10:
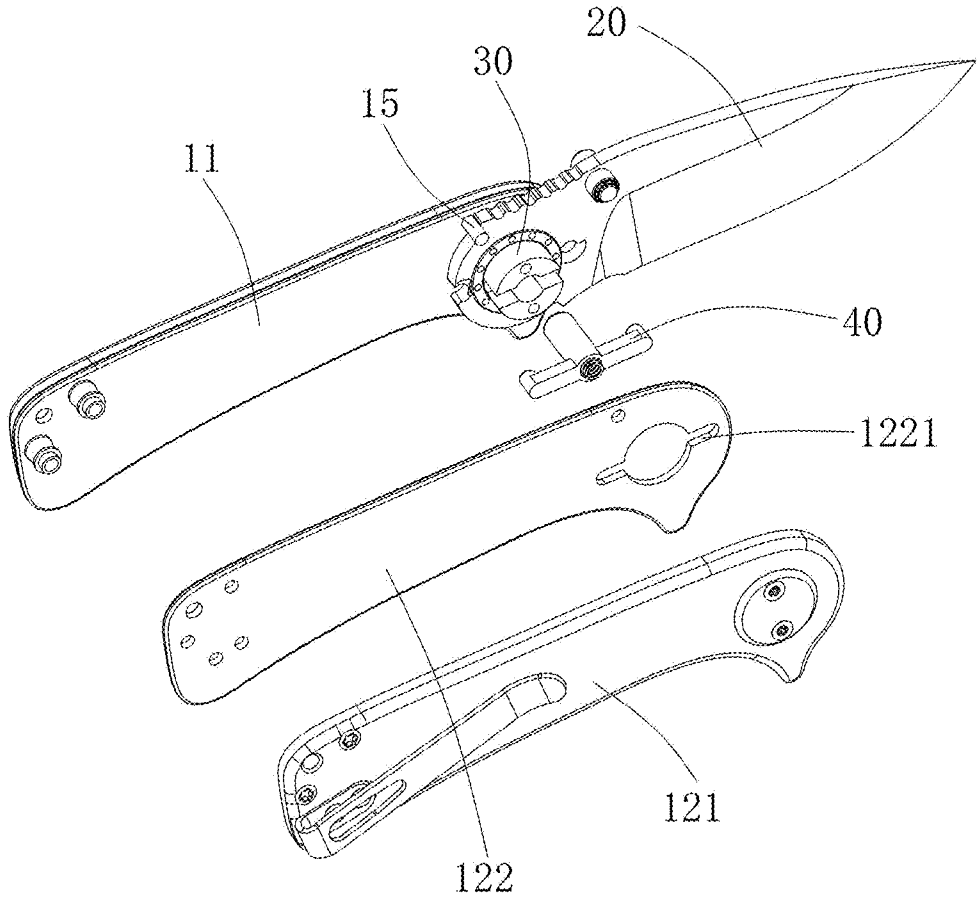
FIG. 10 shows a third exploded schematic diagram of an embodiment of the present utility model.
Figure 11:
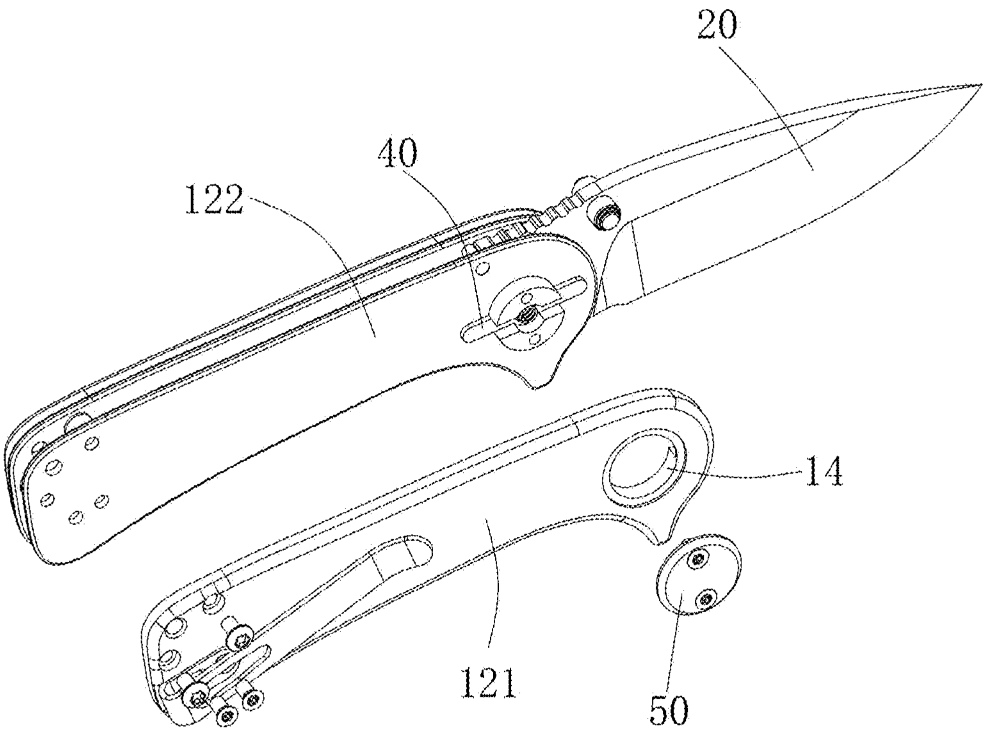
FIG. 11 shows a fourth exploded schematic diagram of an embodiment of this utility model.

Hereinafter, referring to FIG. 8 and FIG. 9, the principle of the unlocking operation of the present application is generally described:

When pressing the left end of button lever 41, the first lock catch 43 or the second lock catch 44 detaches from the lock hole 21 of the blade 20, so that the blade 20 can be stored or unfolded; After the operation is completed, release the finger that presses the button lever 41, and under the action of the reset spring 70, the locking lever is reset, so that the second lock catch 44/the first lock catch 43 is inserted into the lock hole 21 of the blade 20 to complete the locking.

The design of the present invention focuses on the fact that it is primarily: 1. The design of the blade tension adjustment structure ensures that when adjusting the blade tension of the tool of the present application, only the exposed adjusting screw needs to be turned, and there is no need to disassemble components such as the shell, which has the advantage of convenient adjustment;

2. The locking and blade adjustment mechanism of the tool in the present application use fewer components, which simplifies the structure and improves the economy. Meanwhile, it also facilitates the manufacturing, assembly, maintenance, and other work of the tool;
3. The installation of guide slot, guide lever and other structures improves the smoothness and reliability of blade storage/deployment;
4. The tool of the present application will not affect the use of the locking structure when adjusting the tension of the blade, which ensures the stability of the locking structure of the tool.

The above is only a preferred embodiment of the present invention and does not limit the technical scope of the present invention, so any minor modifications, equivalent changes, or modifications made to the above embodiments based on the technical essence of the present invention still fall within the scope of the technical solution of the present invention.

What is claimed is:

1. A folding knife comprising:

a shank, a blade foldable in the shank, a sleeve, a lock lever, a cover plate, and adjusting screws;

wherein the shank comprises a left handle and a right handle, and a storage slot formed between the left handle and the right handle for receiving the blade;

wherein the left and right handles are both provided with a transverse mounting hole, and the sleeve is installed in the transverse mounting holes;

wherein the sleeve has a guide hole extending along a longitudinal axis of the sleeve and a guide slot arranged on a right end of the sleeve;

wherein the lock lever is T-shaped and has a button lever and a guide lever connected to a right end of the button lever, wherein the guide lever further comprises a first lock catch and a second lock catch;

wherein the button lever is received in the guide hole of the sleeve, and the guide lever is received in the guide slot of the sleeve, wherein the blade has a lock hole adapted to receive the first lock catch and the second lock catch; and wherein the cover plate is located on a right side of the right handle and is connected to a right end of the sleeve by the adjusting screws, and the cover plate is further provided with a compression portion for pressing against the right handle.

2. The folding knife of claim 1, further comprises an elastic reset component that drives the lock lever to reset.

3. The folding knife of claim 2, wherein the elastic reset component is a reset spring, the lock lever is provided with a spring hole for mounting one end of the reset spring, and the cover plate has a guide pillar for receiving the other end of the reset spring.

4. The folding knife of claim 3, wherein a left end of the button lever is an unlocking press portion, the sleeve has a sink corresponding to the unlocking press portion, and the left end of the button lever is located in the sink.

5. The folding knife of claim 4, wherein a left end of the sleeve is provided with a stop step.

6. The folding knife of claim 3, wherein the left handle has a left side panel and a left lining located on the right side of the left side panel, while the right handle has a right side panel and a right lining located on the left side of the right side panel, and the blade is located between the left lining and the right lining.

7. The folding knife of claim 3, wherein the shank has a limit rod provided in the storage slot.

8. The folding knife of claim 3, wherein the shank is provided with a clip.

* * * * *